United States Patent Office
2,932,114
Patented Apr. 12, 1960

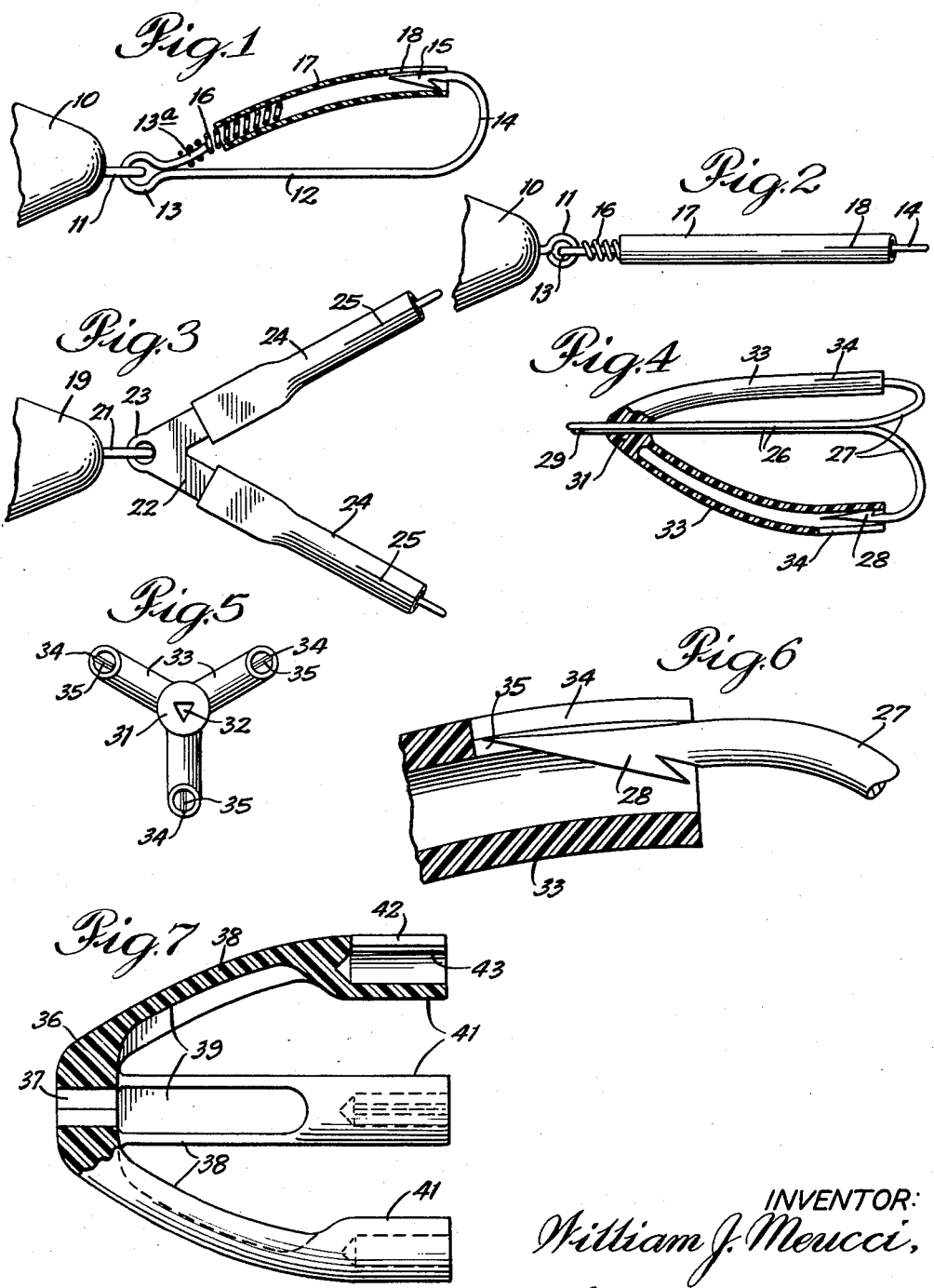

2,932,114
WEEDLESS HOOK
William J. Meucci, Glenview, Ill.
Application March 3, 1958, Serial No. 718,756
6 Claims. (Cl. 43—43.6)

This invention relates to a weedless hook and more particularly to an attachment for conventional single or multiple fishing hooks to prevent snagging of weeds or the like on the hook.

Various types of guards have been proposed for fishing hooks which have generally consisted of spring strips or wires extending from the shank of the hook and terminating near but spaced from the point of the hook. While these devices do assist in preventing fouling of hooks on weeds, or the like, they are not fully effective since the point of the hook is always exposed. If the spring strips are made strong enough and are arranged to cover or surround the point of the hook sufficiently to provide full protection against weeds and the like they will interfere with hooking of a fish.

It is one of the objects of the invention to provide a weedless hook which produces very full and adequate protection of the hook against fouling on weeds or the like.

Another object is to provide a weedless hook in which the entire point of the hook is fully covered and protected against fouling but in which a relatively light pressure, such as that produced by a fish biting or striking, will expose the point of the hook.

According to a feature of the invention, the hook is provided with a weed guard, including a tubular portion of resilient material receiving the point of the hook and provided with a slit in its outer wall through which the point of the hook can easily pass in response to pressure applied by biting or striking of a fish. In one preferred embodiment the interior of the tubular portion is formed with a groove registering with the slit to receive the point of the hook and insure accurate registration thereof with the slit.

A further object is to provide a weedless hook, including a weed guard which may easily be mounted on standard single or multiple hooks.

The above and other objects and features of the invention will be more readily apparent from the following description when read in connection with the accompanying drawing, in which:

Figure 1 is a side elevation with parts in section of a weedless hook embodying the invention;

Figure 2 is a top plan view;

Figure 3 is a view similar to Figure 2 of a double hook embodying the invention;

Figure 4 is a side elevation with parts in section of an alternative weed guard construction applied to a triple hook;

Figure 5 is an end view of the weed guard of Figure 4 looking from the right therein;

Figure 6 is an enlarged partial section of the end portion of the weed guard and the hook point, and Figure 7 is an elevation with parts in section of an alternative weed guard construction for use with triple hooks.

The weedless hook, as shown in Figures 1 and 2 may be utilized with any conventional type of bait, such as a plug, spool, fly or popper, partially indicated at 10, and may be attached to the bait through an eyelet 11 or similar fastening means as conventionally employed. In the case of a fly or popper the body of the bait may be formed on or secured directly to the shank of the hook. The hook itself includes a conventional fishing hook having an elongated shank 12 formed at one end with an eyelet 13 for attachment to the eyelet 11 of the bait and having a curved hook portion 14 at its opposite end terminating in a barbed point 15.

According to the present invention, a weed guard is provided in association with the hook to protect the point thereof from fouling on weeds, or the like. As shown in Figures 1 and 2, the weed guard comprises a coil spring 16 formed of a material such as Phosphor bronze which is fitted over an extension 13a of the eyelet 13 and secured thereto as by soldering or cementing. The spring 16, as seen in Figure 1, extends upward from the shank 12 at an acute angle thereto and generally toward the hook point 15.

A sleeve 17 of yielding material, such as rubber or plastic tubing, is slipped over the spring 16 and may be cemented thereto to prevent accidental slipping off. Alternatively, the spring 16 could be roughened to grip the sleeve securely and prevent accidental removal. Beyond the spring 16 the sleeve continues toward the hook point 15 and is of a length to receive the entire hook point, including the complete barb, as seen in Figure 1. To permit easy removal of the hook point the sleeve is formed in its outer wall portion with a slit 18 co-extensive with the hook point and through which the hook point can pass when the sleeve is pressed inward toward the shank.

The spring 16 normally biases the sleeve outward so that it would tend to occupy a normal position adjacent to but slightly outside of the hook point. The sleeve can be slipped over the hook point by flexing it upward and inserting the point into the end thereof or could be swung inside of the point and pressed outward to force the point through the slit 18. With the sleeve in the assembled position, the entire point is covered thereby so that it is fully protected against snagging on weeds or other debris in the water during use. However, when a fish bites or strikes, the pressure of the fish's mouth against the sleeve will press the sleeve inward toward the hook shank causing the hook point to pass outward through the slit 18 to hook the fish. Even though the sleeve will resist a fairly high wiping pressure as created by passing over weeds or the like in the water from the portion adjacent the spring toward the point, a very slight pressure on the sleeve toward the shank will cause the sleeve to swing inward and expose the point for hooking the fish.

Figure 3 illustrates a similar construction as applied to a double hook. In this construction, the bait is indicated generally at 19 and is provided with an eyelet 21 to which the double hook may be attached. The double hook may be of conventional construction with two hooks similar to the single hook shown in Figures 1 and 2 joined at an acute angle to each other in a single eyelet which is fastened to the eyelet 21. The weed guard in this case comprises a flat metal spring 22 having two arms lying at the same angle to each other as the hooks and joined in a central portion 23 registering with the eyelet of the double hook and secured thereto. Tubes 24 of yielding material and formed with slits 25 in their outer end portions are slipped over the two arms of the spring and respectively enclose the points of the hooks. This construction is substantially identical to that of Figures 1 and 2 and operates in the same manner, the only difference being that a conventional double hook rather than a single hook is employed.

The construction shown in Figures 4, 5 and 6 is adapted for use with a conventional triple hook in which three single hooks are connected with their shanks engaging each other and having a single fastening or eyelet for mounting on a bait. As shown, each hook has a shank portion 26 and a hook portion 27 terminating in a barbed point 28. The shanks 26 lie in contact with each other and may be joined as is common in similar constructions. In any event, they terminate in a common mounting means indicated generally at 29 at one end of the shanks by which the hook construction may be connected to a bait.

In this construction the guard comprises a central mounting or hub portion 31 which is provided with a triangular opening 32, as best seen in Figure 5, to fit over the shanks of the hook portions. The three shanks of the hooks which lie in a triangular arrangement may fit closely in the triangular opening 32 and the guard may be secured thereby by cementing or clamping or may in many cases be adequately mounted simply by making the opening of a size to provide a tight fit. The guard further includes three tubular arms 33 of yielding material, such as plastic or rubber, which may be secured to or integrally molded with the hub portion 31. As shown in Figure 4, each of the arms is tubular throughout its full length and is integrally formed with the hub portion 31 as by molding. The end of each of the arms receives the point 28 of one of the three hook portions and is provided with a slit 34 co-extensive with the point through which the point can move, as described in connection with Figure 1.

According to a further feature of the invention, as best seen in Figure 6, each of the tubular arms is formed at its end adjacent to the point of the hook with a generally V-shaped groove 35 registering with the slit 34 and in which the point of the hook may be received. With this construction, when the arm is pressed inwardly the groove will guide the point of the hook accurately into the slit 34 so that there is no chance of the tip of the hook fouling on the sleeve itself and so that the hook point will pass easily through the slit to be exposed when a fish strikes or bites.

Figure 7 illustrates a further alternative construction generally similar to Figures 4 to 6 except for differences in the shape of the arms. The guard, as shown in Figure 7, comprises a central mounting or hub portion 36 provided with a triangular opening 37 to receive the shanks of a conventional triple hook assembly. Arms 38 are integrally molded with the hub portion and are of channel shaped cross section, with the channels as illustrated at 39 opening inward. The outer ends of the arms are molded with tubular portions 41 of sufficient length to receive the points of the hooks and slits 42 are formed in the outer walls of the tubular portions through which the hook points may pass. Internal grooves 43, similar to the grooves 35 may be provided in the tubular portions for the purpose described above.

While several embodiments of the invention have been shown and described herein, it will be understood that they are illustrative only and not to be taken as a definition of the scope of the invention, reference being had for this purpose to the appended claims.

What is claimed is:

1. A weedless hook comprising, in combination with a hook having a shank with a hook portion at one end thereof terminating in a point, a guard comprising an elongated flexible element secured at one end thereof to the shank adjacent to the other end thereof and extending toward the point of the hook, said element lying wholly at one side of the shank and terminating at its other end in a hollow tubular end portion forming a complete annulus in cross section into which the point only of the hook extends so that the point of the hook is completely encircled thereby and having a slit in the outer wall thereof through which the point of the hook passes when the element is pressed inward toward the shank of the hook, the flexible element being resiliently biased away from the shank of the hook.

2. The weedless hook of claim 1 in which the hollow tubular end portion is formed with an internal groove at its outer side into which the slit opens and in which the point of the hook normally lies.

3. A weedless hook comprising, in combination with a hook having a shank with fastening means at one end and a hook portion at the other end terminating in a point, a guard comprising an elongated spring secured to said one end of the shank and extending generally toward the point at an angle to the shank, and a tube of flexible material fitting over and supported by the spring with its free end portion receiving the point of the hook and having a slit in its outer wall through which the point of the hook passes when the sleeve is pressed inward toward the shank.

4. A weedless hook comprising, in combination with a hook having an elongated shank with fastening means at one end and a plurality of hook portions at the other end at angles to each other and terminating in spaced points, a guard comprising a mounting portion secured to the shank adjacent to said one end and a plurality of elongated flexible fingers extending toward the points of the hook portions respectively, each of the fingers terminating in a tubular end portion forming a complete annulus in cross section into which a hook point extends so that the point of the hook is completely encircled thereby and having a slit in the outer wall thereof through which the hook point passes when the finger is moved inwardly toward the shank.

5. The construction of claim 4 in which the mounting portion and the fingers are integrally molded of resilient material.

6. A weedless hook comprising, in combination with a hook having an elongated shank with fastening means at one end and a plurality of hook portions at the other end at angles to each other and terminating in spaced points, a guard comprising a mounting portion and a plurality of fingers extending from the mounting portion at angles to each other all integrally formed of resilient material, the mounting portion having an opening therethrough receiving the shank adjacent to said one end of the shank and the fingers extending respectively toward the points of the hook portions, each finger terminating in a tubular end portion forming a complete annulus in cross section into which a hook point extends so that the point of the hook is completely encircled thereby and having a slit in the outer wall thereof through which the point passes when the finger is moved inwardly toward the shank.

References Cited in the file of this patent

UNITED STATES PATENTS

| | | |
|---|---|---|
| 539,149 | Shattuck | May 14, 1895 |
| 801,437 | Baker | Oct. 10, 1905 |
| 2,241,320 | Sarff | May 6, 1941 |
| 2,261,068 | Mackovich | Oct. 28, 1941 |
| 2,558,121 | Bailey | June 26, 1951 |
| 2,590,461 | Rasch | Mar. 25, 1952 |
| 2,623,321 | Braukus | Dec. 30, 1952 |
| 2,811,804 | Heath | Nov. 5, 1957 |